United States Patent

Quain

[15] 3,670,757

[45] June 20, 1972

[54] CONTROL REGULATOR

[72] Inventor: Wilbur C. Quain, Winona, Minn.

[73] Assignee: Lake Center Industries, Winona, Minn.

[22] Filed: Oct. 15, 1969

[21] Appl. No.: 866,671

[52] U.S. Cl. ........................137/103, 137/495, 137/627.5, 137/DIG. 8, 98/2.05, 165/41, 237/34
[51] Int. Cl. .................................................G05d 7/00
[58] Field of Search..................137/103, 627.5, 495, DIG. 8, 137/102

[56] References Cited

UNITED STATES PATENTS

| 2,652,847 | 9/1953 | Segebarth | 137/103 |
| 3,026,908 | 3/1962 | Blair | 137/627.5 |
| 3,150,856 | 9/1964 | Deibel et al. | 137/627.5 X |
| 3,125,111 | 3/1964 | Daly | 137/102 |
| 3,545,472 | 12/1970 | Franz | 137/627.5 X |

FOREIGN PATENTS OR APPLICATIONS

| 244,431 | 4/1963 | Australia | 137/103 |

*Primary Examiner*—Alan Cohan
*Assistant Examiner*—David J. Zobkiw
*Attorney*—Richard J. Renk

[57] ABSTRACT

A regulator to control devices and appliances which is actuated by pressure differentials coming from the source of pressure such as a vacuum source and also by feedback pressure differentials from the device being controlled to provide self-monitoring servo type control.

5 Claims, 6 Drawing Figures

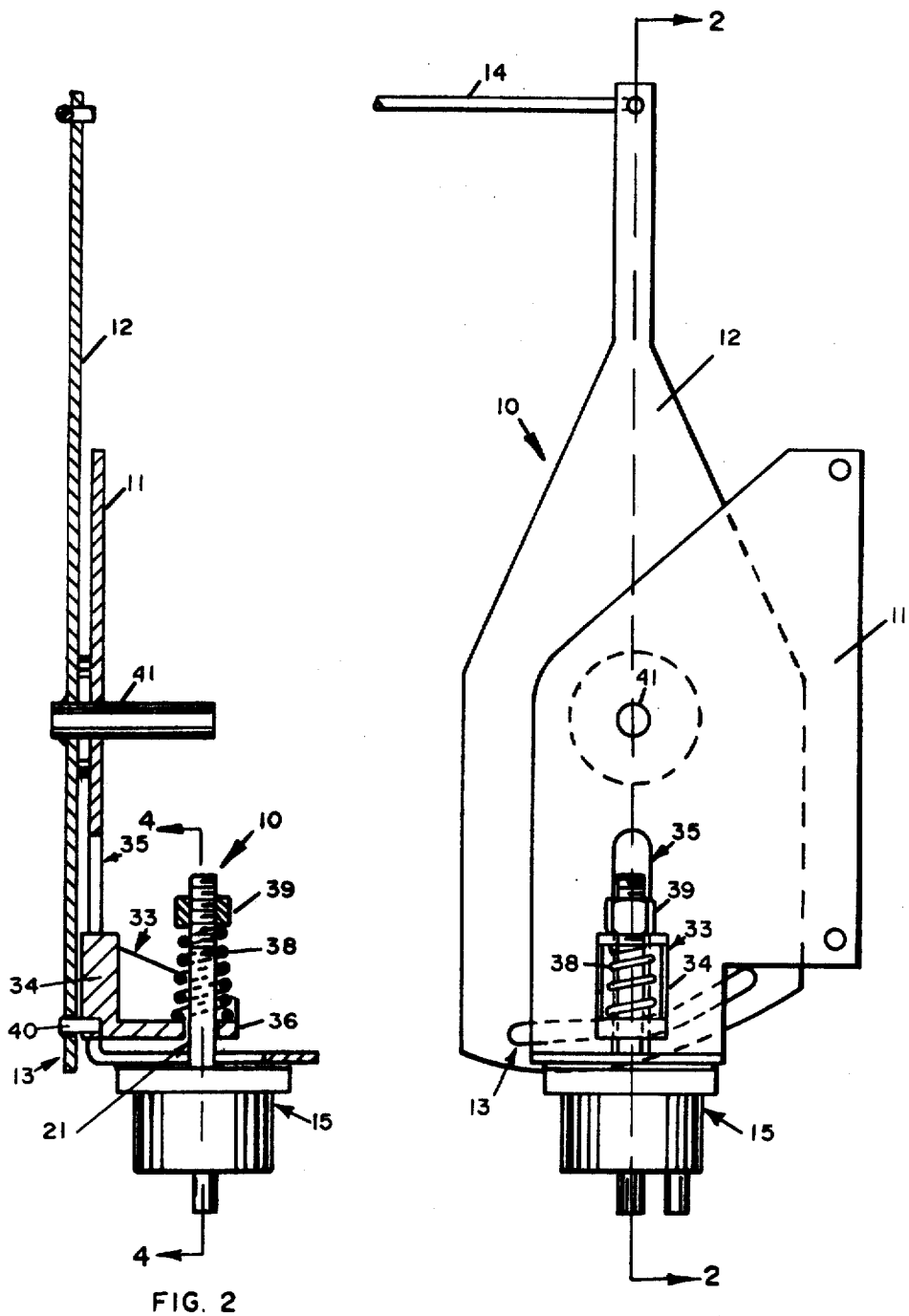

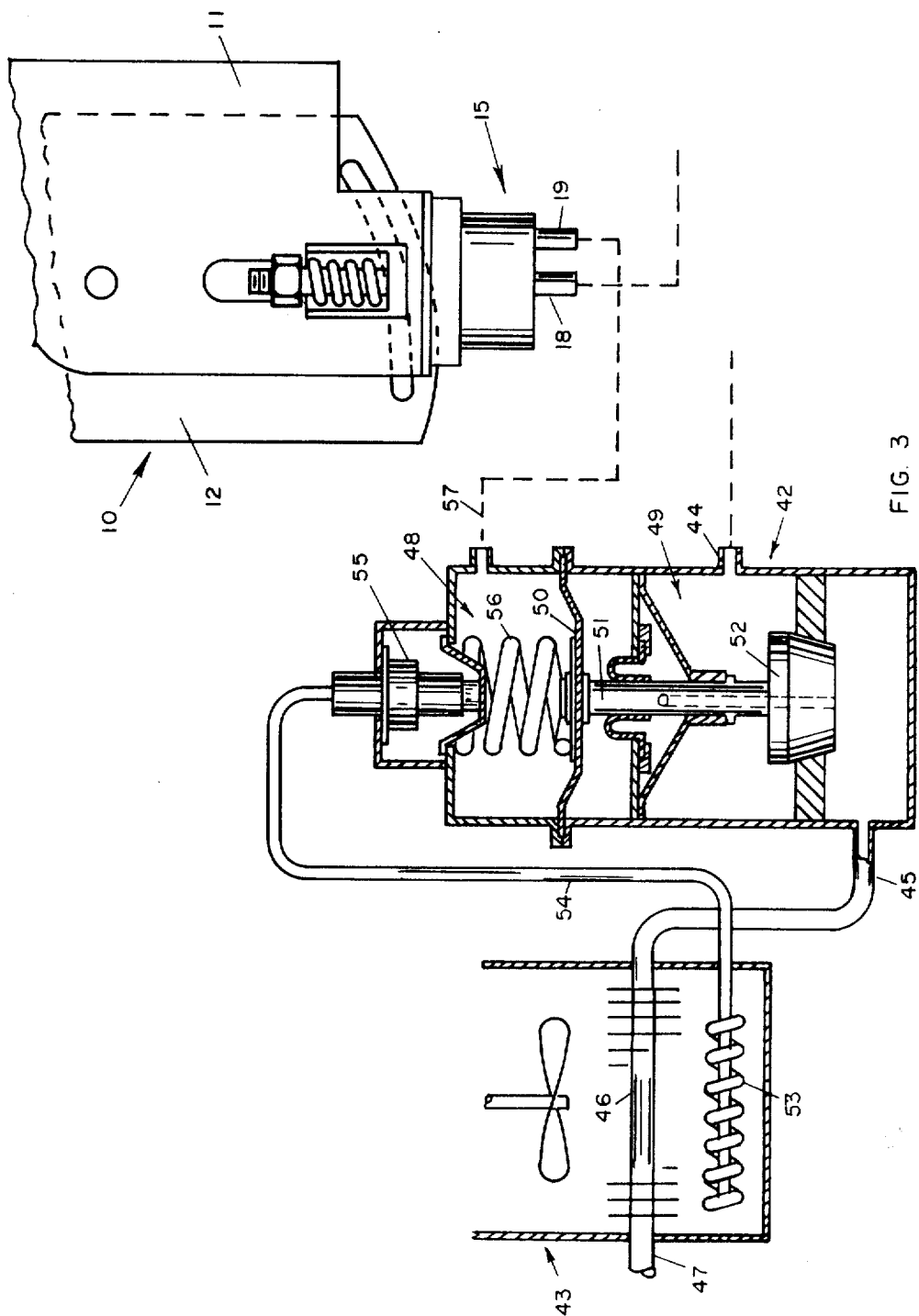

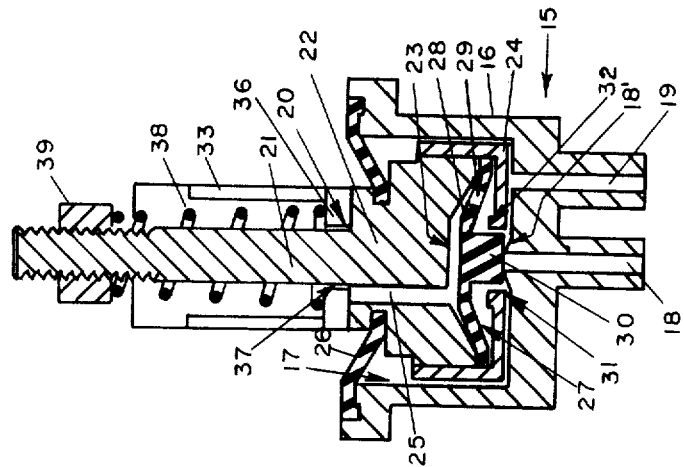
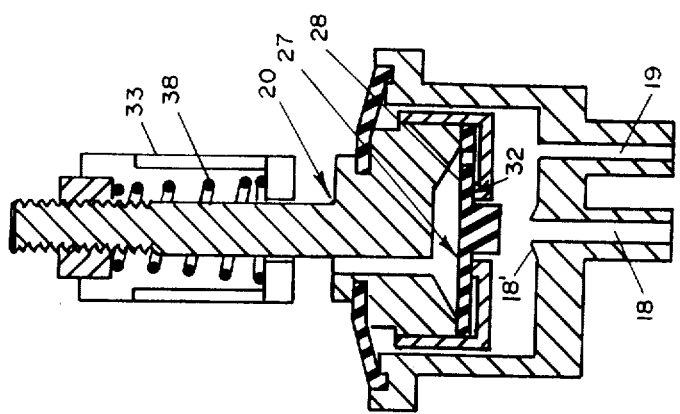
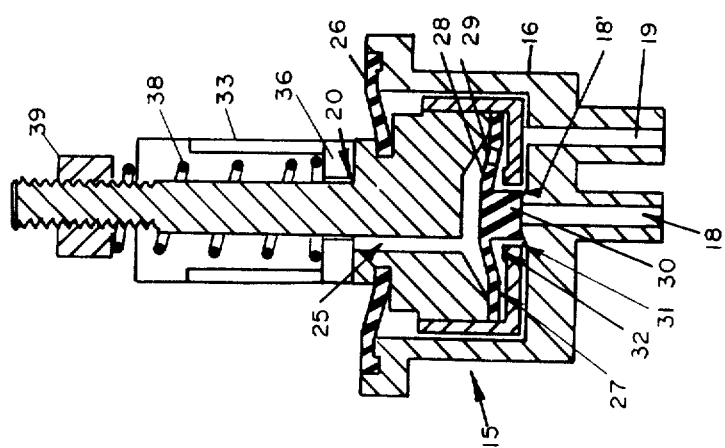

3,670,757

CONTROL REGULATOR

BACKGROUND OF INVENTION

Where there is a source of vacuum it is sometimes desirable to utilize it as a power source in actuating other devices and appliances. An application of this type has specific utility in controlling automobile heating units.

However, because of the vacuum fluctuation, it has been difficult to provide uniform control; consequently, constant manual readjustment has been required.

SUMMARY OF INVENTION

The present invention overcomes the problem of irregular vacuum control by providing a very sensitive control regulator. This arrangement is actuated by small pressure differentials coming from the vacuum source and also by pressure differentials from the device being controlled. The regulator thus acts like a self-monitoring servo-system.

DESCRIPTION OF DRAWINGS

FIG. 1 is a front view of the regulator control of the invention.

FIG. 2 is a sectional view taken substantially along lines 2—2 of FIG. 1.

FIG. 3 is a schematic view showing the regulator connected to an automotive heating unit.

FIG. 4 is sectional elevation taken along lines 4—4 of FIG. 2 showing the regulator portion in the "off" position.

FIG. 5 is a sectional view as in FIG. 4 showing the regulator in the "full-open" position; and FIG. 6 is a sectional view as in FIG. 4 showing the regulator in a "modulating" position.

PREFERRED EMBODIMENTS

As shown in FIGS. 1 and 2, the control device is indicated generally at 10 and includes a mounting bracket 11, a control lever 12 having a cam slot 13 therein, an actuating cable 14, and a regulator 15.

With reference to FIGS. 4 to 6, the regulator includes a cylindrical housing 16 having a cavity 17, a vacuum source port 18 connected to a manifold or the like, and a control port 19 connected to the device being controlled such as a heater valve. Extending into the cylindrical cavity 17 is a plunger 20. The plunger has a threaded stem 21 for calibration extending outwardly of the cavity with a head 22 carried within the cavity.

The underside of the plunger head 22 is recessed in the nature of a truncated cone as at 23. The plunger head 22 and recessed area 23 are enclosed on the bottom by an inverted cap 24 pressed around the periphery of the head. Cap 24 closely nests within and slides within the housing cavity 17 as the plunger head moves. An air passageway 25 extends through head 22 from the truncated chamber 23 to the atmosphere.

A circular rubber diaphragm 26 seals the plunger head 20 within the cavity 17. The diaphragm is anchored to the housing 16 and to a groove in the plunger head 22; it allows movement of the plunger head within the cavity 17 and provides a slight biasing action as will be described later.

For the purpose of regulating vacuum between the vacuum source port 18 and the control port 19, or from the control port to atmosphere, there is provided a pliable valve 27 within the trunkated chamber 23. The valve has a cylindrical disc portion 28 with a small vent opening 29 therein. Extending from the center bottom of the valve disc 27 is a circular boss 30 which protrudes through a slightly larger hole 31 in the cap 24. A rim or flange 32 projects upwardly around the hole 31 in the cap 24 to provide a seat on which the valve disc 28 rests and seals in some of its operative positions.

Movement of plunger 20 to its selective operating positions is accomplished through control lever 12 (FIG. 1) via cam slot 13 and an angle shaped guide block 33. The guide block has one of its legs 34 slideably mounted in a vertical guide slot 35 in the lower end of mounting bracket 11 (FIG. 1). The horizontal leg 36 of the guide block has a hole 37 therein through which plunger stem 21 passes. A biasing spring 38 surrounds the stem and has its lower side in engagement with the guide block leg 36 and its upper side nesting under a nut 39 on the end of plunger stem 21 to urge the plunger upwardly in certain control positions. Movement of the guide block up or down is accomplished by means of a pin 40 (FIG. 2) fixed at the rear of guide block leg 34 which extends into the cam slot 13 of lever 12.

Lever 12 is pivoted about a rivet 41 fastened to bracket 11. Movement of control cable 14 causes lever 12 to move thereby changing the position of cam slot 13. This causes pin 40 to move the guide block 33 up or down to vary the upward force of spring 38 against the plunger stem 21. This, as will be explained below, establishes the vacuum condition in chamber 17 and in the appliance being controlled.

The application of the invention is not limited to any specific use. However, for purposes of illustration, as shown in FIG. 3, it will be described in conjunction with a thermostatic hot water control valve 42 of an automotive type heater 43. In this use, hot water from the automotive cooling system is fed through an inlet pipe 44 to hot water valve 42, thence through valve outlet pipe 45 to a heating coil 46, and returns via hose 47 to the automobile's water jacket.

Hot water valve 42 is vacuum actuated and includes a vacuum chamber 48 and a water chamber 49. The vacuum chamber has a diaphragm 50 connected to the upper end of a valve stem 51. The valve stem 51 extends into the water chamber 49 and has a valve stopper 52 on the lower end to regulate the flow of water between inlet pipe 44 and outlet pipe 45. An expansion-type fluid temperature sensing element 53 connects via a tube 54 to a moveable expansion cylinder 55, the latter in turn being connected via a spring 56 to diaphragm 50 in vacuum chamber 48.

If the fluid in tube 54 contracts because the sensor is cooler than the setting of control device 10, the pressure of cylinder 55 on spring 56 will decrease. This results in valve stem 51 moving upwardly and opening valve stopper 52 allowing a greater volume of water to pass through heating coil 46. Conversely, if the sensor is hotter than the control setting, fluid in tube 54 expands causing downward expansion of cylinder 55 to close valve stopper 52 to a greater degree and reduce the amount of water flowing to heating coil 46.

The degree of vacuum in the valve chamber 48 is controlled by the regulator 15 of the invention through hose connection 57 to regulator vacuum port 19. By providing a predetermined vacuum level in the chamber 48, the regulator 15 either adds to or subtracts from the pressure required from the sensing element 53 to cause the valve stopper 52 to close or open. An increase in vacuum in the chamber 48 causes the diaphragm 50 to move upwardly thereby opening the stopper 52 for more heat. A decrease of vacuum, i.e., more air pressure in chamber 48 causes the stopper to move downwardly and reduce the water flow. Once the newly established vacuum setting is very close to being satisfied at the set-point of the control, the modulating expansion and contraction of the sensing device 53 will cause the diaphragm 50 to gradually open and close to keep just the right amount of water passing to the heating coil 46. The temperature in the automobile for example, then can be changed to different levels by adjusting the position of control lever 12 via cable 14 through a switch on the automobile dash (not shown).

In FIG. 4, the regulator 15 is shown in the full "off" position. In such position the plunger 20 is moved fully down by cam pin 40 causing the guide block leg 36 to strike the top of the plunger. This causes valve boss 30 to seat over vacuum port projection 18' extending into chamber 17 and close off vacuum to control port 19. Air is then able to enter the water valve vacuum chamber 48 via vent 25, disc opening 29, cap opening 31, and control port 19 thereby shutting off valve stopper 52 and heat in coil 46.

In the full "on" position (FIG. 5), the operating lever 12 is moved in the opposite direction causing guide block 33 to move spring 38 and plunger 20 up. This puts vacuum port 18 in full communication with control port 19 and the valve vacuum chamber 48. Full vacuum in chamber 48 causes the water valve stem 51 and stopper to move upwardly allowing full heating water to pass to heating coil 46. In this position air is prevented from entering the vacuum regulator as the disc portion 28 of valve 27 engages and seals against seat 32 of the plunger's inverted cap 24.

In the regulator's intermediate control position, the control lever is between its full "off" and full "on" positions. At these settings as shown by FIG. 6, the plunger 20 somewhat floats against the biasing action of the sealing diaphragm 26 and the spring 38 to provide modulating control action. For example, as temperature sensor 53 senses the heat increasing, its expansion causes water valve diaphragm 50 and valve stopper 52 to move downwardly to reduce the hot water flow. Consequently, the cubic volume in vacuum chamber 48 increases thereby increasing the vacuum level in this chamber. The increased vacuum level in chamber 48 is communicated through control port 19 which draws the plunger 20 downwardly thereby unseating the disc valve 27 from cap seat 32. Air then enters through passageway 25, vent 29, inverted cap hole 31, control port 19, and thence to the chamber 48 to keep the vacuum in the chamber 48 and water valve at the level determined by the setting of control lever 10.

As the temperature sensor 53 cools by virtue of water stopper 52 reducing the volume of hot water flowing to the heater 46, the fluid in the sensor will contract thereby causing vacuum diaphragm 50 and valve stopper 52 to move upwardly and allow more water to pass. The degree of vacuum in the chamber 48 will then be decreased which will be communicated to regulator 15 through port 19. This vacuum reduction will reduce the suction on plunger 20 and allow it to move upwardly slightly resulting in disc valve 27 sealing against seat 32 and cutting off the air being introduced into vacuum chamber 48. At this time, upward movement of the plunger may not be sufficient to lift the regulator valve boss 30 from sealing engagement with vacuum port projection 18'. Thus, both vacuum and air sources are shut off. The water valve stopper 52 is thus positioned at the correct position to satisfy the temperature setting of the control device.

Further cooling of the sensor 53 will cause water valve diaphragm 50 to move upwardly further resulting in less vacuum in chamber 48. This reduces the suction on regulator plunger 20 and allows it to be moved upwardly by the biasing action of rubber diaphragm 26. Such action will cause valve boss 30 to move upwardly off of the manifold vacuum source port 18 and provide direct communication to the vacuum chamber 48 thus opening water stopper 52 still further. As the sensor 53 then gains more heat, the process will be reversed and the water stopper will close to reduce heat.

From the above it will be seen that air vent system 29 and 31 will be open whenever the vacuum in chamber 48 exceeds the setting of the control lever and vice versa. The regulator therefore modulates to keep the air temperature passing sensor 53 at the control lever set point. In the positions between the full "on" and full "off" positions, the vacuum required to pull the plunger downwardly is determined by the force required to overcome the action of sealing diaphragm 26 and force of spring 38. In other words, the more spring 38 is forced upwardly, the more vacuum required to overcome it, the longer the regulator will call for heat.

While the regulator has been shown and described with specific shapes, it is obvious that other shapes may be used without departing from the scope of the following claims.

What I claim is:

1. A regulator comprising:
    a. a housing provided with a vacuum source port and a control port and a means of communication between said ports,
    b. a plunger moveable within said housing,
    c. sealing means connected between said housing and said plunger to provide a cavity within said housing,
    d. said plunger having a passageway for venting said cavity to atmosphere,
    e. means carried by said plunger having a valve seat thereon and also having a chamber therein,
    f. pliable valve means carried by said plunger,
    g. said pliable valve means having means for sealing said vacuum source port from said control port and means for engaging said valve seat carried by said plunger for selectively sealing said cavity in said housing from the passageway in said plunger,
    h. said pliable valve means in one position of said plunger when said vacuum source port is sealed being deformed so as to move said means for sealing said cavity away from the valve seat carried by said plunger, and in another position of said plunger said pliable valve means engaging said valve seat carried by said plunger, and
    i. means operable to change the position of said plunger within said housing to control the vacuum passed by said regulator from said vacuum source port to said control port.

2. A regulator as claimed in claim 1 wherein said chamber has a bottom opening therein and wherein a part of said pliable valve means is carried in such chamber and includes a portion bridging said opening and wherein the means for selectively sealing said vacuum source port extends through said opening.

3. A regulator as claimed in claim 2 wherein the portion of said pliable valve means bridging said opening is in the shape of a relatively flat disc and wherein the means extending through said opening for sealing said vacuum source port includes a boss.

4. A regulator as claimed in claim 1, wherein means are provided in said pliable valve means to provide a vent from said cavity within said housing to the passageway in said plunger.

5. A control device comprising:
    a. a housing having a vacuum source port and a control port,
    b. a moveable plunger within said housing,
    c. sealing means connected between said housing and said plunger to provide a cavity within said housing,
    d. valve means carried by said plunger and operable to seal said vacuum source port from said control port, and
    e. means for adjusting the position of said plunger to change the position of said valve means relative to said vacuum source port and said control port, said means for adjusting said plunger being located outwardly of said housing including a bracket having a guide slot therein, a guide block slideably guided by said slot, said guide block being operably connected to said plunger through a biasing element, a control lever having cam means and means coupling said cam means to said guide block to change the position of said block and the force of said biasing element on said plunger.

* * * * *